United States Patent [19]

Hyman

[11] Patent Number: 4,919,530
[45] Date of Patent: Apr. 24, 1990

[54] EYEGLASS ASSEMBLY

[76] Inventor: Roger L. Hyman, 5249 N. 35th St., Milwaukee, Wis. 53209

[21] Appl. No.: 301,820

[22] Filed: Jan. 25, 1989

[51] Int. Cl.⁵ .......................... G02C 1/00; G02C 5/02
[52] U.S. Cl. ........................................ 351/85; 351/86; 351/124; 351/133
[58] Field of Search .................... 351/52, 85, 86, 124, 351/128, 130, 133, 154

[56] References Cited

U.S. PATENT DOCUMENTS 2,835,063 · 5/1958 Worthington ........................ 351/52

FOREIGN PATENT DOCUMENTS 676869 8/1952 United Kingdom ................... 351/85

Primary Examiner—Rodney B. Bovernick
Attorney, Agent, or Firm—Andrus, Sceales, Starke & Sawall

[57] ABSTRACT

An eyeglass assembly includes a lower lens holding frame and an upper detachable brow piece. The lower frame includes a pair of bridge pieces that span the lens holding openings and are engaged by the brow piece.

3 Claims, 3 Drawing Sheets

EYEGLASS ASSEMBLY

BACKGROUND OF THE INVENTION

The present invention relates to an eyeglass assembly program and particularly to an assembly that permits the interchanging of frame pieces to easily allow the alteration of the appearance of a pair of eyeglasses.

High fashion eyeglasses and prescription optical wear have been marketed that utilize a variety of shapes for the lens holding frames. This fashion and optical eyewear is expensive; and thus the cost of owning a number of pairs in various shapes and colors often becomes prohibitive.

It is therefore desirable to provide a pair of fashion eyeglasses or optical wear that will have interchangeable frame members so that a number of shapes and/or colors may be combined to provide a unique appearance. It is also desirable to have the interchangeable frame members connected in such a manner that the connector or pivot point is not visible and thus does not detract from the aesthetics of the eyeglasses.

SUMMARY OF THE INVENTION

An eyeglass assembly program that includes a lower lens holding frame having a pair of lens receiving members that are connected at and disposed on each side of a centrally located nose piece.

The lower lens holding frame is provided with a pair of flexible bridge pieces which span the opening between the nose piece and the outer edge of the frame, providing strength to the lower lens-holding frame.

In accordance with another aspect of the invention, brow pieces are provided which are releasably connected to the lower lens holding frame member and the bridge pieces. When the eyeglass system is as assembled, it stabilizes and secures the frame's strength.

In accordance with yet another aspect of the invention, downwardly extending flanges are provided to conceal the bridge pieces and the connectors utilized to join the brow member and the lower lens holding frame member.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
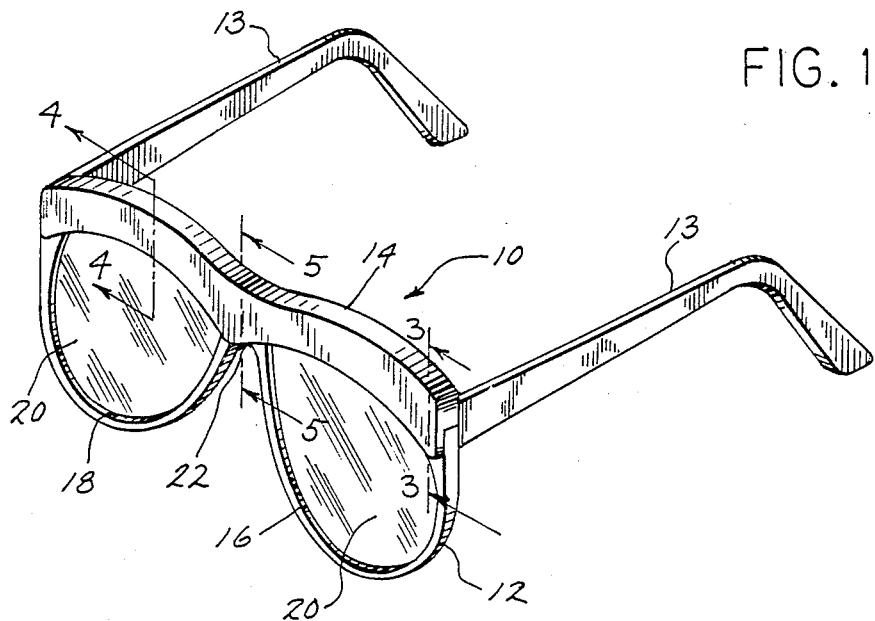
FIG. 1 is a perspective view of a pair of eyeglasses constructed according to the present invention.
Figure 3:
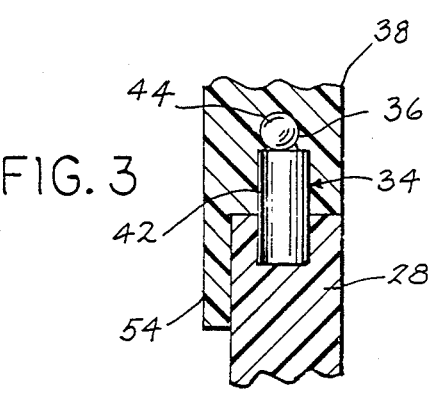
FIG. 3 is a cross-sectional view taken along line 3—3 of FIG. 1.
Figure 2:
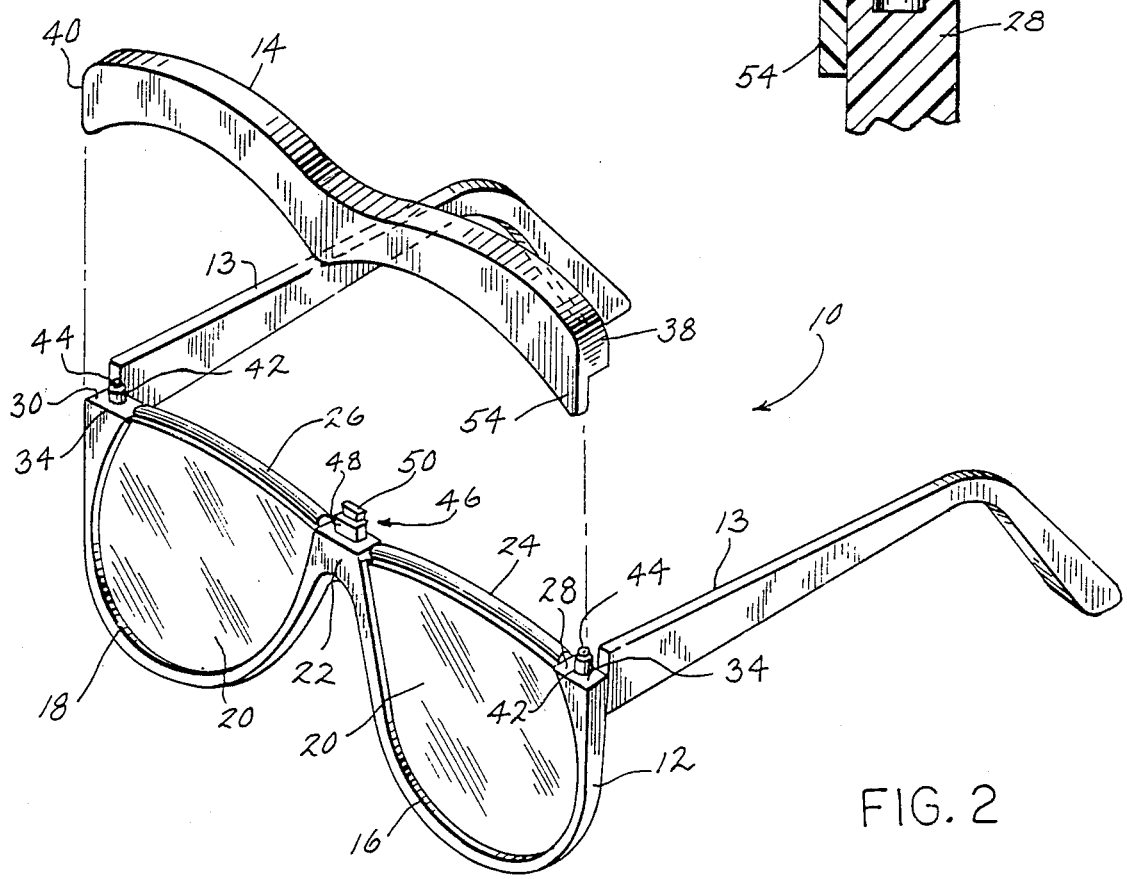
FIG. 2 is an exploded perspective view of the eyeglasses of FIG. 1.
Figure 4:
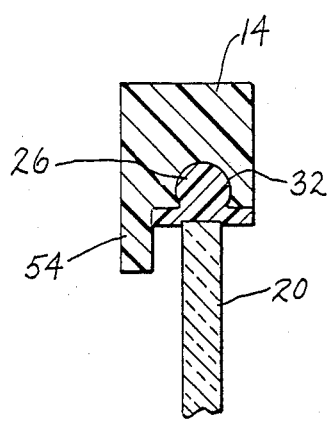
FIG. 4 is a cross-sectional view taken along line 4—4 of FIG. 1.
Figure 5:
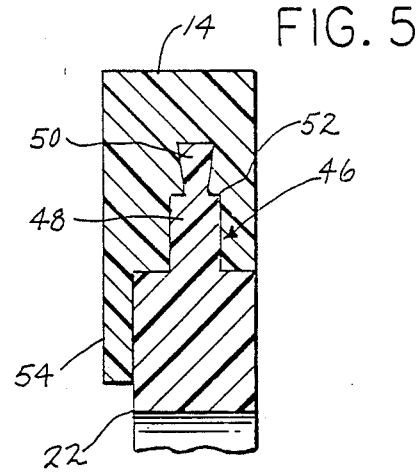
FIG. 5 is a cross-sectional view taken along line 5—5 of FIG. 1.

As seen in FIG. 1 and FIG. 2, an eyeglass or sunglass assembly 10 consists of a lower lens holding frame member 12 having a pair of rearwardly extending temple pieces 13 and an upper brow member 14.

Lower frame member 12 includes a pair of lens holding members 16 and 18 that are provided with internal grooves (not shown) into which a lens 20 may be inserted. Lens holding members 16 and 18 are integrally connected with and disposed on either side of nose piece 22. The upper openings of members 16 and 18 are closed by a pair of flexible bridge pieces 24 and 26 which may be formed from plastic or wire. Bridge pieces 24 and 26 span the opening between nose piece 22 and outer edges 28 and 30 of members 16 and 18. Bridge pieces 24 and 26 provide additional structure and stability for lower frame member 12.

Brow member 14 is similarly provided with an internal groove 32 which engages and holds bridge pieces 24 and 26.

Figure 6:
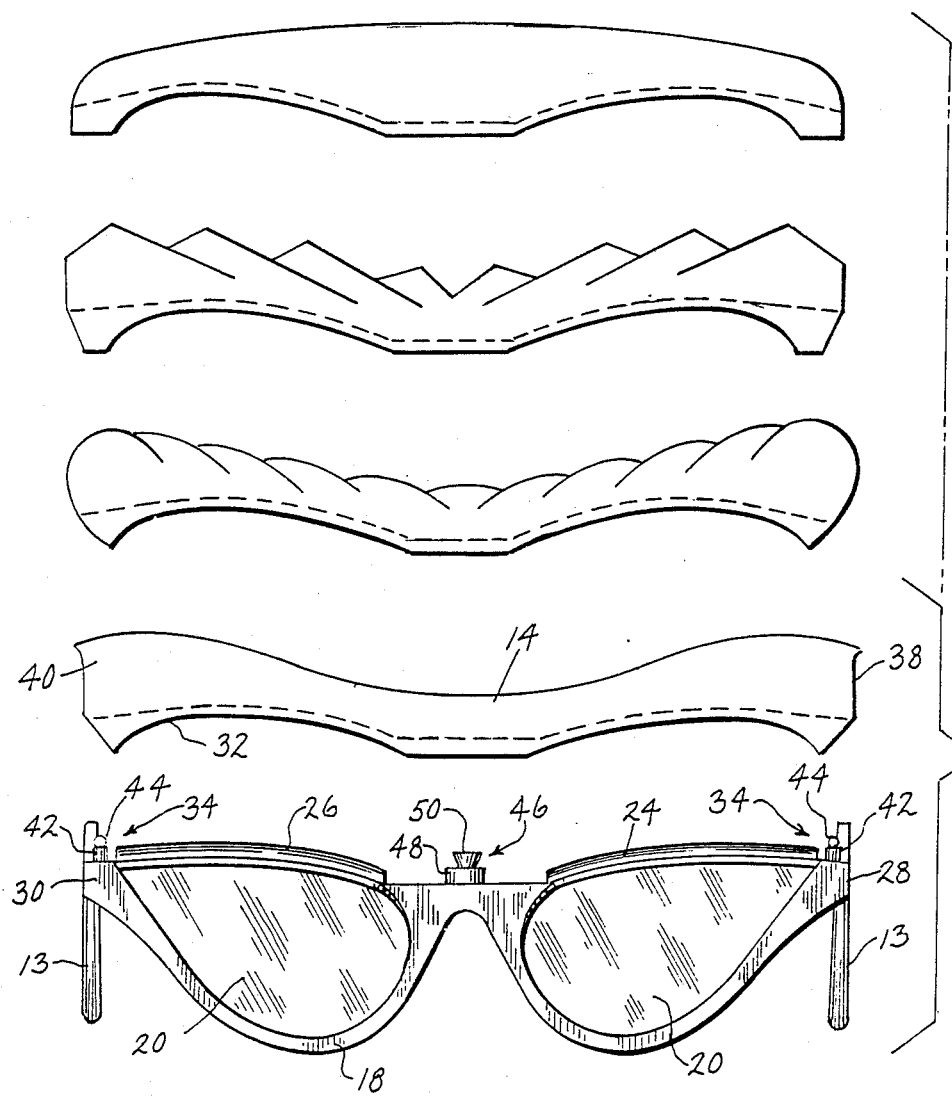
FIG. 6 is a front exploded view of a pair of eyeglasses constructed according to the present invention and embodying an alternate shape for the frame and a plurality of bridge pieces.
Figure 7:
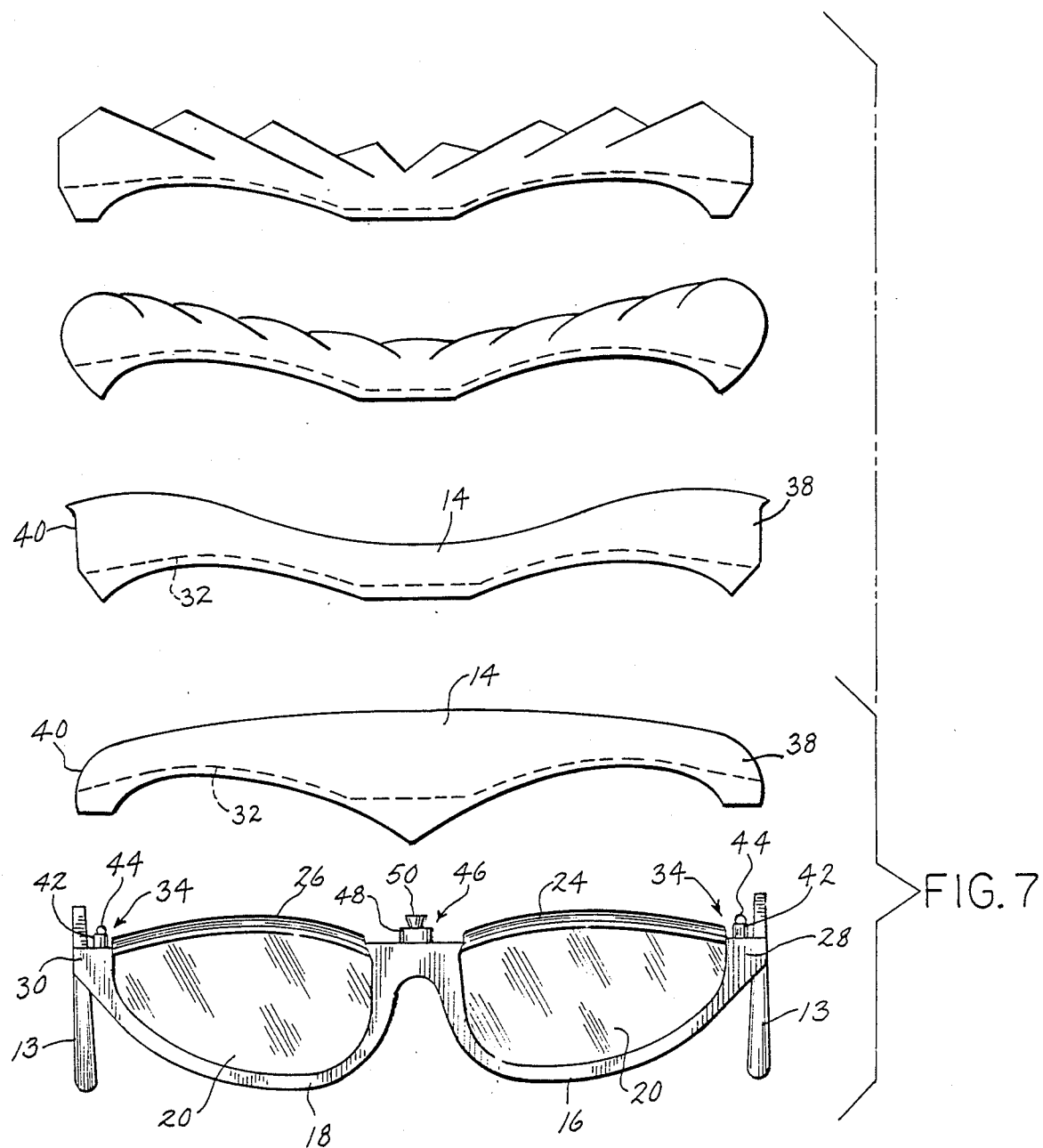
FIG. 7 is a front exploded view of a pair of eyeglasses constructed according to the present invention and embodying yet another shape for the frame and a plurality of bridge pieces.

While the type of connector may obviously be varied along with the placement, FIGS. 2, 6 and 7 show brow member 14 connected to lower lens holding frame 12 by means of a pair of pins 34 disposed within and extending upwardly from outer edges 28 and 30. Pins 26 are received in pin receiving cavities 36 located within the outer edges 38 and 40 of brow member 14. Pins 34 consist of post 42 disposed within and extending from lower member 12 and a ball 44 integral with and at the top of post 42. Cavities 36 are configured to accept and frictionally engage the post and ball configuration of pins 34.

Similarly, nose piece 22 is provided with an upwardly extending finger 46 having a base portion 48 and a reduced upper portion 50. Finger 46 is accepted by a centrally located hole 52 in brow member 14 that is configured to frictionally engage base portion 48 and upper portion 50.

The forward edge portion of brow member 14 is provided with a flange 54 disposed forwardly of pins 34 and finger 46 and extending downwardly in a plane substantially parallel to that of pins 34 and finger 46 so that the connection between pins 34 and cavities 36 and finger 46 and hole 52 can be concealed.

As shown in FIG. 6 and FIG. 7 the shape, configuration or color of lower frame member 12 and brow member 14 may be varied so that numerous eyeglass styles may be attained by mating the various members.

Various modes for carrying out the invention are contemplated as being within the scope of the following claims particularly pointing out and distinctly claiming the subject matter which is regarded as the invention.

I claim:

1. An eyeglass assembly comprising:
   a lower lens holding frame member having a pair of lens receiving members connected at and disposed on each side of a centrally located nose piece, said lens receiving members defining an upwardly extending opening through which the lens may be inserted into said frame
   a pair of bridge pieces spanning each of said openings and connecting said nose piece to an outer portion of said lens receiving member
   an upper brow member provided with a groove for receiving said bridge pieces connector means for releasably connecting said brow member to said lower lens holding frame, said connector means comprising a plurality of pin receiving holes in one of said upper brow member or said lower frame member and a plurality of pins extending from the other of said members a right temple piece extending rearwardly from the right edge portion of one of said upper brow member or lower frame member and a left temple piece extending rearwardly from the left edge portion of one of said upper brow member or lower frame member.

2. The eyeglass assembly of claim 1 wherein said pins include a finger disposed in the nose piece of one of said members and a pin disposed at both outer edges of one of said members.

3. The eyeglass assembly of claim 1 wherein said upper brow includes a flange member disposed forwardly of said pins and extending in a direction substantially parallel to said pins so as to conceal the connection between said pins and said holes.

* * * * *